United States Patent [19]

Ramun et al.

[11] Patent Number: 4,670,983
[45] Date of Patent: Jun. 9, 1987

[54] METAL CUTTING SHEAR AND ADAPTER FOR MOUNTING ON A BACKHOE

[75] Inventors: Michael Ramun; John Ramun, both of Youngstown, Ohio

[73] Assignee: Allied Gator, Inc., Youngstown, Ohio

[21] Appl. No.: 801,468

[22] Filed: Nov. 25, 1985

[51] Int. Cl.⁴ ............................................. B23P 19/00
[52] U.S. Cl. ........................................ 30/134; 30/228; 414/740
[58] Field of Search .................. 30/131, 134, 225, 231; 83/609; 144/34 E; 294/104; 414/722, 724, 740

[56] References Cited

U.S. PATENT DOCUMENTS

| | | | |
|---|---|---|---|
| 4,188,721 | 2/1980 | Ramun et al. | 30/134 |
| 4,198,747 | 4/1980 | LaBounty | 30/134 |
| 4,376,340 | 3/1983 | Ramun et al. | 30/134 |
| 4,403,431 | 9/1983 | Ramun et al. | 30/134 X |
| 4,439,921 | 4/1984 | Ramun et al. | 30/134 |
| 4,450,625 | 5/1985 | Ramun et al. | 30/134 |
| 4,519,135 | 5/1985 | LaBounty | 30/134 |
| 4,543,719 | 10/1985 | Pardoe | 30/134 |
| 4,558,515 | 12/1985 | LaBounty | 144/34 E |

Primary Examiner—E. R. Kazenske
Assistant Examiner—Michael D. Folkerts
Attorney, Agent, or Firm—Harpman & Harpman

[57] ABSTRACT

A material handling and metal shear attachment for a backhoe has an adapter enabling the shear attachment to be mounted on a boom or dipstick of any one of a number of different backhoes for actuation by the hydraulic system of the backhoe. A fixed blade is secured to the adapter and a movable cutting blade is pivoted to the fixed blade, a hydraulic piston and cylinder assembly mounted on the fixed blade moves the movable cutting blade in shearing relation to the fixed blade. The fixed and movable blades are shaped and positioned relative to their pivotal engagement to move objects being sheared towards the blades pivotal engagement rather than away therefrom.

21 Claims, 12 Drawing Figures

METAL CUTTING SHEAR AND ADAPTER FOR MOUNTING ON A BACKHOE

BACKGROUND OF THE INVENTION

1. Field of the Invention

This invention relates to heavy duty shears of the type that are mounted on backhoes and powered by hydraulic cylinders for the efficient handling of scrap and especially metal scrap and shearing the same into reuseable scrap sizes. Metal scrap from industrial buildings being dismantled occurs in many different forms and sizes from pipes of various diameters and lengths to structural beams such as I-beams, channels, angles and the like and metal sheets and plates and various automobile and truck frames, railroad cars and the like and wherein the shear must be able to pick up, move and cut the metal pieces regardless of size or shape and without any wedging or binding action of the work pieces relative to the shears.

2. Description of the Prior Art

Prior devices of this type are best represented in our U.S. Pat. Nos. 4,188,721, 4,376,340, 4,403,431, and 4,450,625.

Other prior art is represented by U.S. Pat. Nos. 4,198,747 and 4,519,135.

In the present invention, there is a single unitary cast fixed blade mounted in an adapter and a single unitary cast movable blade pivoted to the fixed blade with the adapter being detachably secured to the boom or dip stick of a back hoe or the like. The hydraulic system of the backhoe or the like includes a piston and cylinder assembly, the piston of which engages the adapter for moving the same and the shear in pivotal relation to the boom or dip stick.

SUMMARY OF THE INVENTION

The metal cutting shear and adapter for mounting on a backhoe comprises a fixed blade having a movable blade pivoted thereto, the fixed blade being mounted in an adapter which in turn is adapted to be pivotally mounted on the end of a boom or dip stick of a back hoe in place of the normal bucket. A piston and cylinder on the boom of the backhoe engages the adapter so as to impart pivotal motion thereto and a second piston and cylinder on the fixed blade engages the movable blade so as to move it in a shearing relation with respect to the fixed blade. Both blades are unitary cast steel and have detachable hardened cutting bars with the movable blade having a V-shaped cutting edge configuration. The fixed blade has an open slot therein beyond a straight cutting edge and forms means for confining the movable blade to a path alongside the fixed blade where it will operate to move objects being sheared toward the blade's pivotal engagement rather than away therefrom when it is moved by the hydraulic piston and cylinder.

DESCRIPTION OF THE DRAWINGS

FIG. 6 is a cross section on line 6—6 of FIG. 2;

FIG. 7 is an enlarged cross section on line 7—7 of FIG. 2;

DESCRIPTION OF THE PREFERRED EMBODIMENT

Backhoes, such as used in industry, are powered machines having an extensible boom and hydraulic controlled piston and cylinders mounted thereon. A dip stick is normally pivotally attached to the boom and a bucket is normally attached to the end of the dip stick and is moved by one or more hydraulic piston and cylinder assemblies comprising part of the hydraulic system of the backhoe.

Applicants' device is an attachment for a backhoe that is used in place of the bucket for handling, shearing and moving structural beams, pipes, cables, and other structural members and the like normally found in structures being dismantled.

Figure 1:
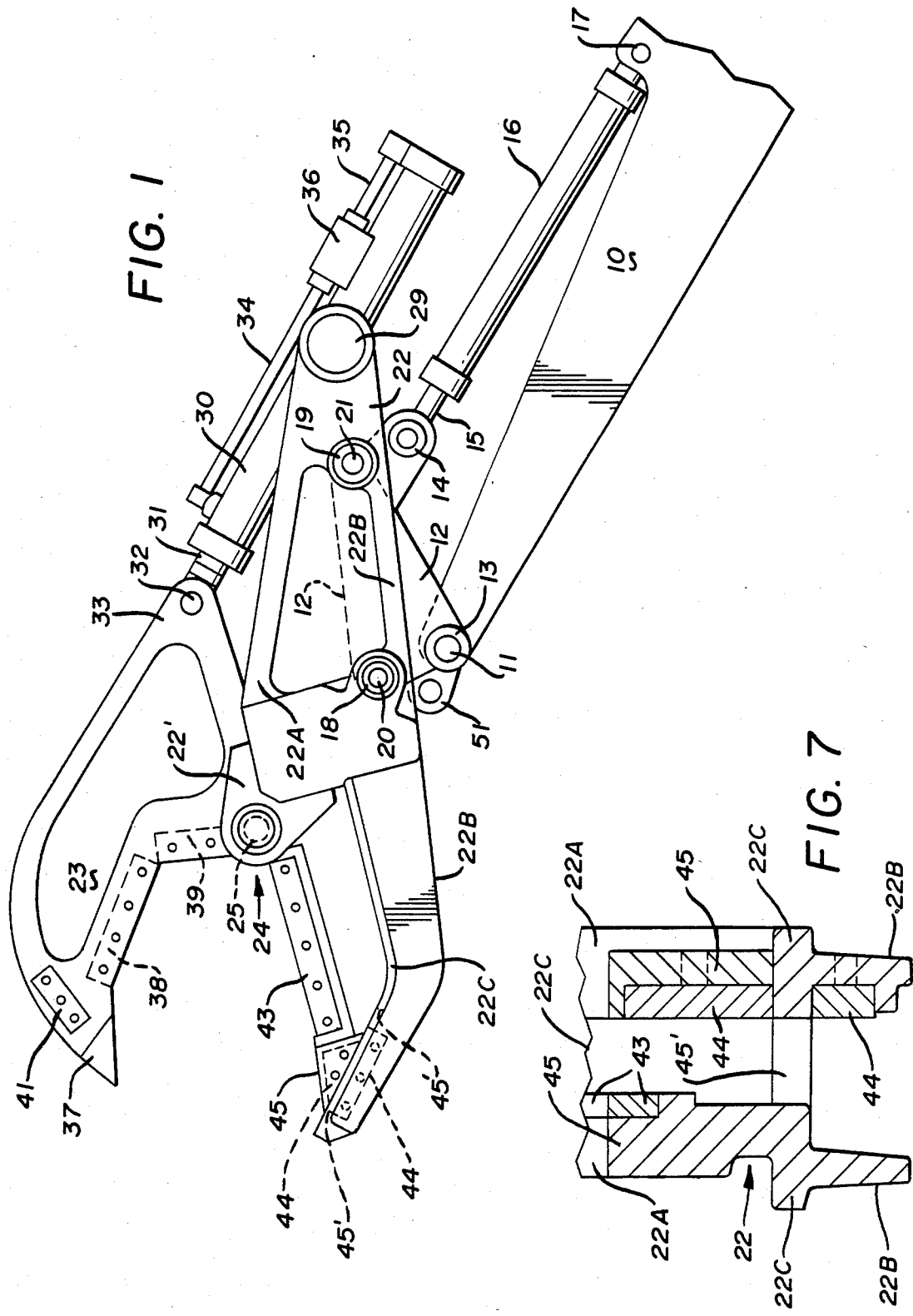
FIG. 1 is a side elevation of the metal cutting shear and adapter mounted on the boom or dip stick of a backhoe.
Figure 10:
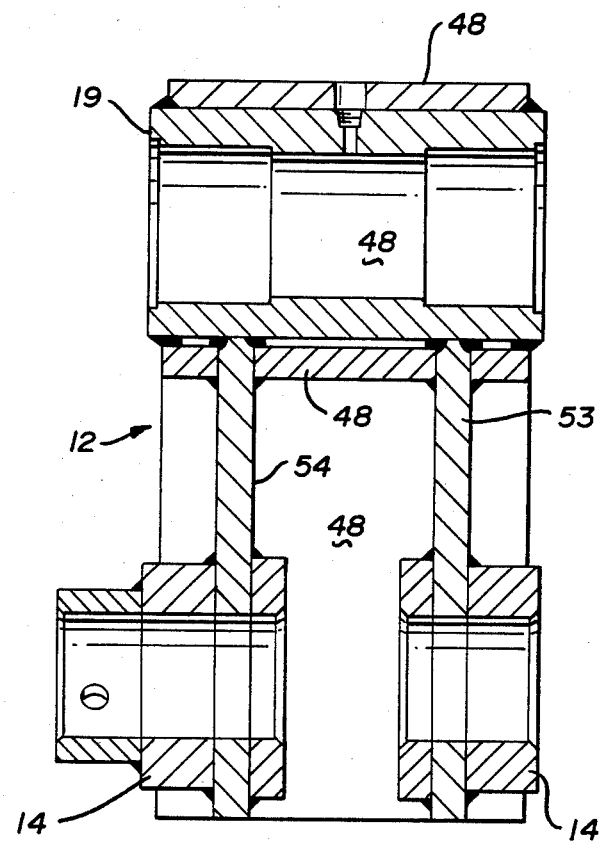
FIG. 10 is an enlarged cross section on line 10—10 of FIG. 8.
Figure 8:
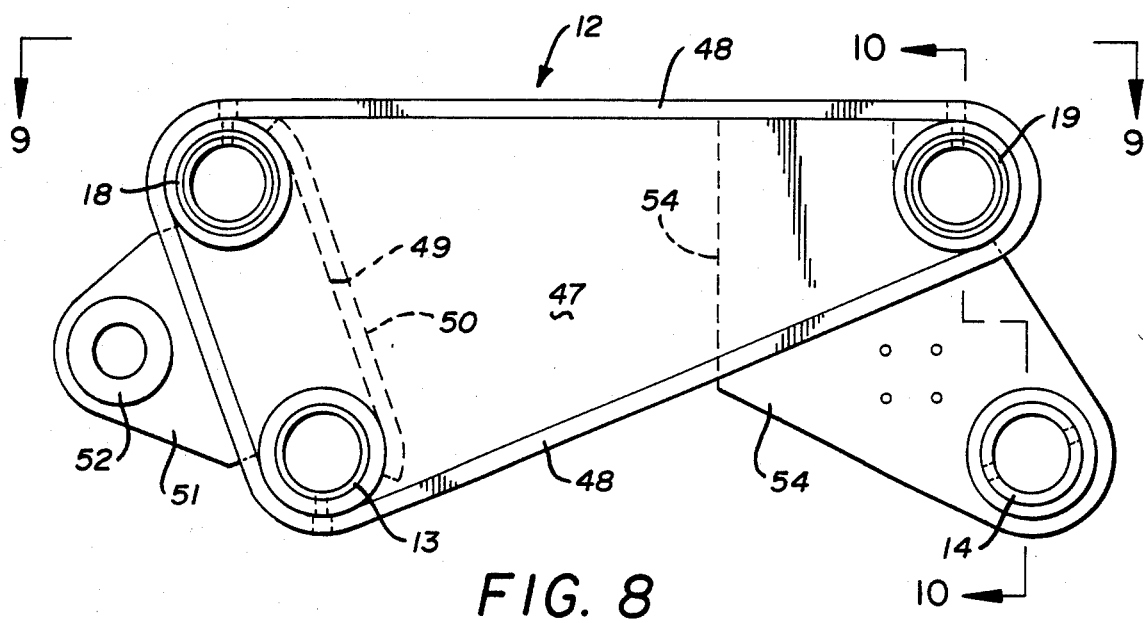
FIG. 8 is an enlarged side elevation of the adapter seen in FIGS. 1,2 and 6.
Figure 9:
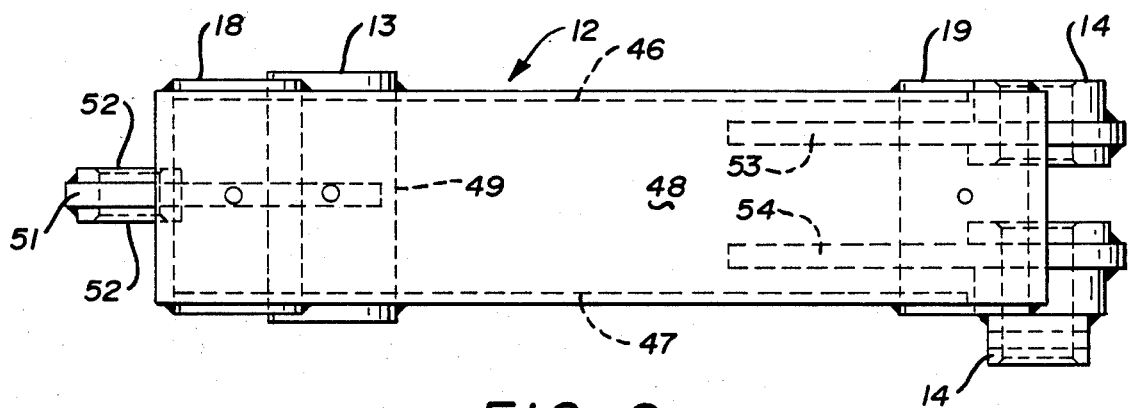
FIG. 9 is a top plan view of the adapter of FIG. 8.

As will be seen in FIG. 1 of the drawings, a backhoe boom or dip stick 10 has a transverse pivot 11 positioned therethrough near its outer end so as to pivotally support an adapter 12 having bushings 13 engaged on the transverse pivot 11. Secondary bushings 14 on the adapter 12 are engaged on a piston rod 15 of a piston and cylinder assembly 16, the cylinder of which is pivotally attached to the boom or a dip stick 10 by a transverse pivot 17. The adapter 12, which is best illustrated in FIGS. 8,9 and 10 of the drawings, has horizontally spaced third and fourth bushings 18 and 19 respectively which respectively receive mounting pins 20 and 21 positioned transversely of a parallel beam unitary cast steel fixed blade 22. A single unitary cast steel movable blade 23 is pivotally engaged on the fixed blade 22 by an adjustable shaft and thrust bearing arrangement located at 24 on the drawings of FIGS. 1 and 2 and illustrated in enlarged cross section in FIG. 5 of the drawings wherein a shaft 25 is positioned transversely in the movable blade 23 in bushings 26 and against thrust bearings 27 and shims 28.

Figure 5:
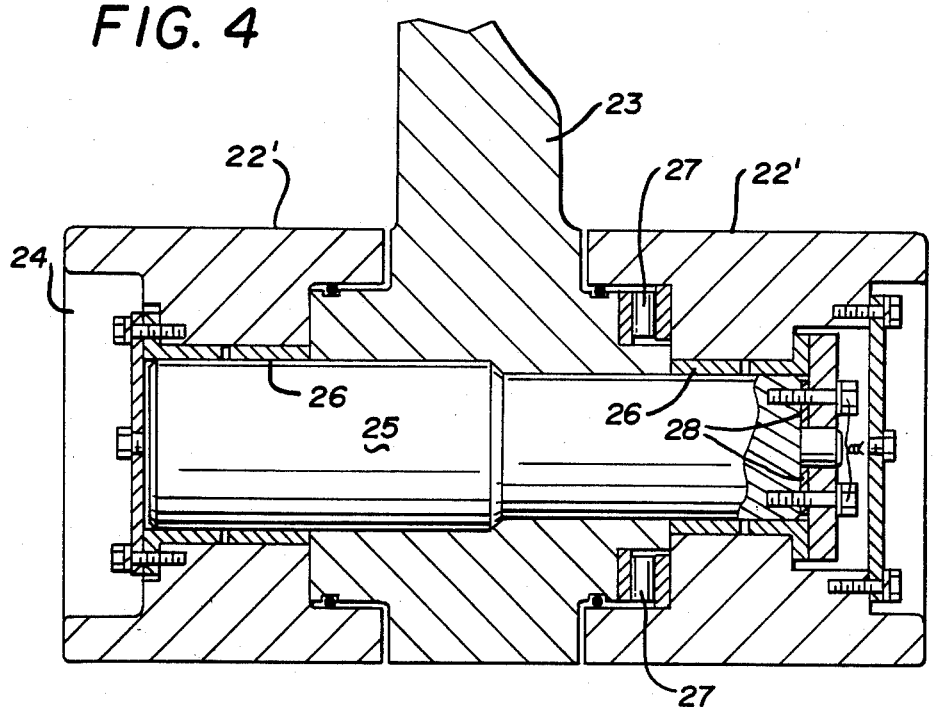
FIG. 5 is an enlarged cross section on line 5—5 of FIG. 2.

As shown in FIG. 5, cast movable blade 23 has openings of two different diameters which are only slightly larger than the diameter of shaft 25 which has a matching dual diameter shape. As further shown, in FIG. 5, there are bushings 26 in the fixed blade parts 22' and there are thrust bearings 27 positioned in an annular area of the movable blade 23 at only one side thereof. The shaft 25 is positioned tightly in the opening in the movable blade 23 and it is retained therein by an end plate bolted to the right end of the shaft by shims 28, as shown in FIG. 5. This arrangement is kept centered by an aperture in the end plate registering over a projecting stud on the end of shaft 25. The bolts may be removed and the shims replaced. By tightening the bolts shaft 25 may be adjusted and the thrust bearings 27 will be more tightly pressed against blade 23. The annular disposition of the thrust bearings 27 with respect to shaft 25 positively holds the blade 23 in proper alignment with the fixed blade.

Figure 2:
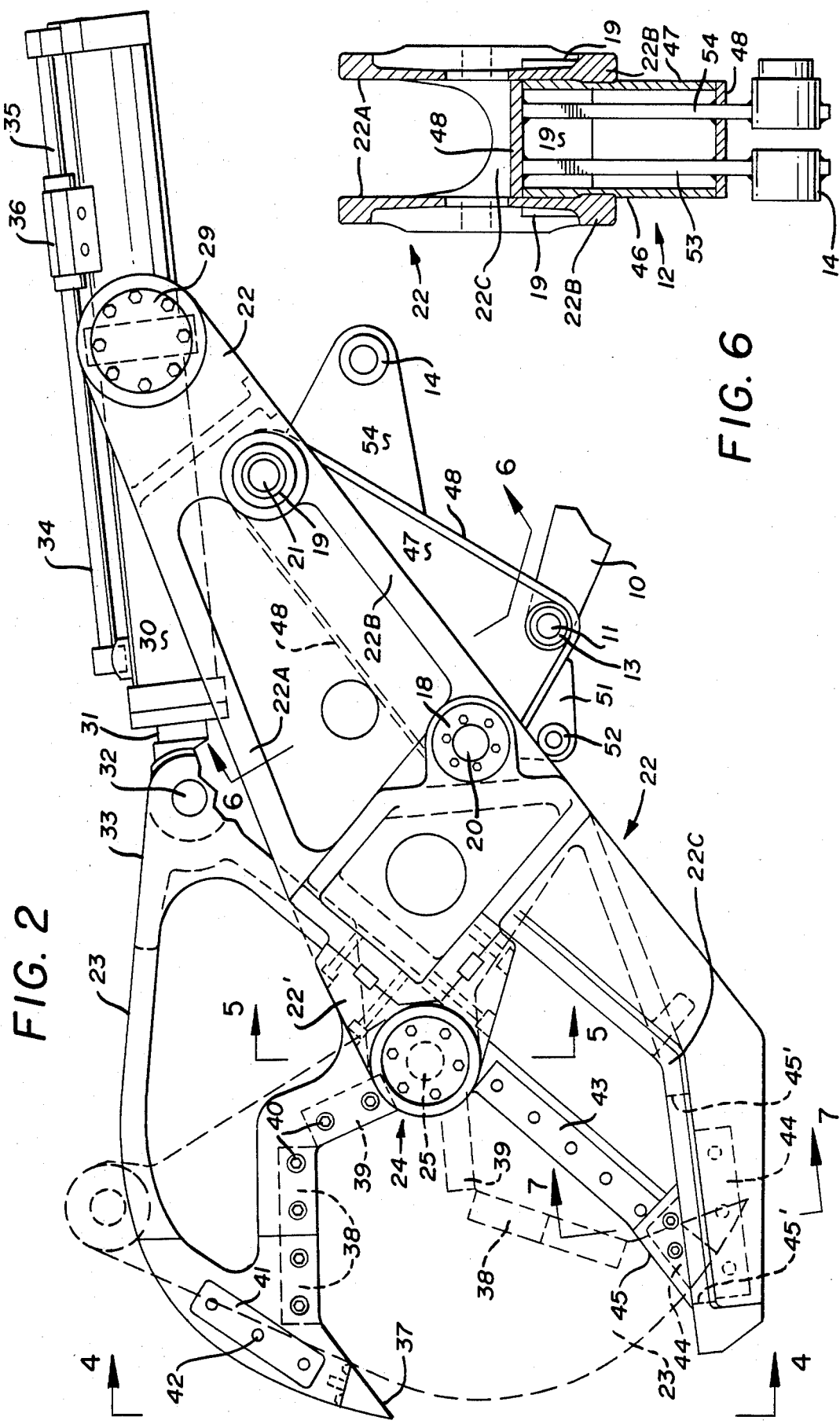
FIG. 2 is an enlarged side elevation of the shear illustrated in FIG. 1.
Figure 3:
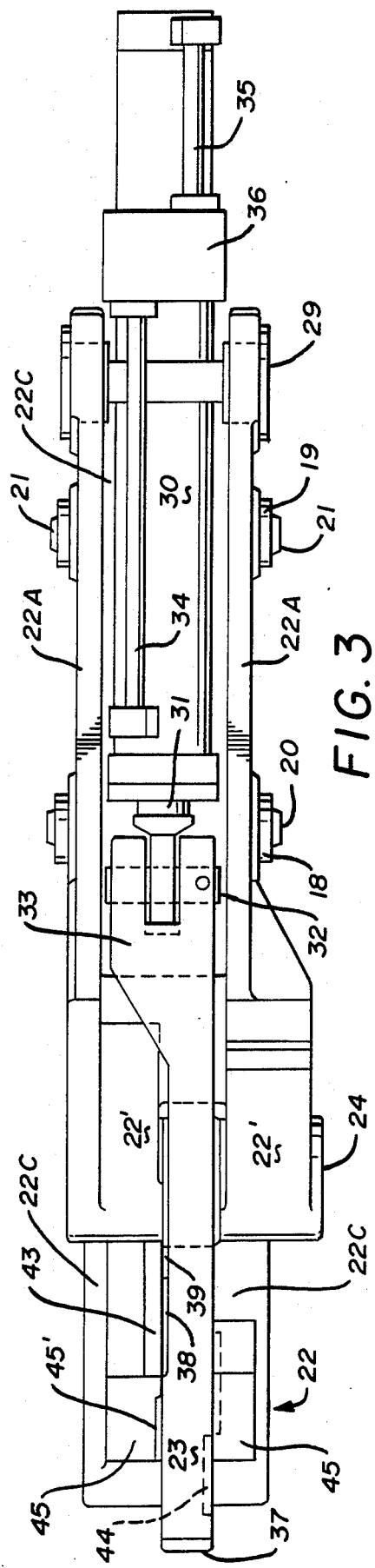
FIG. 3 is a top plan view of the shear seen in FIG. 2.
Figure 11:
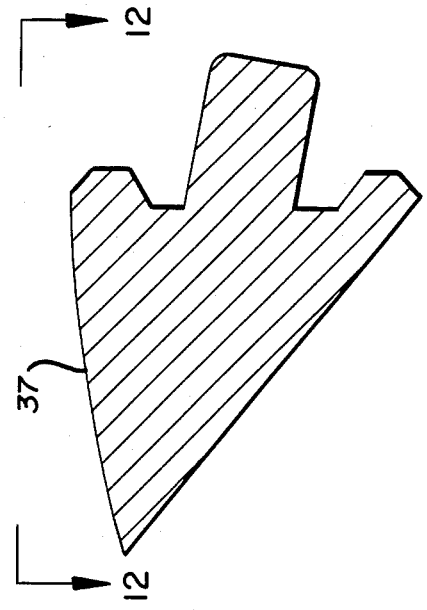
FIG. 11 is a side elevation of a hardened tip portion of the movable blade seen in FIGS. 1 and 2.
Figure 12:
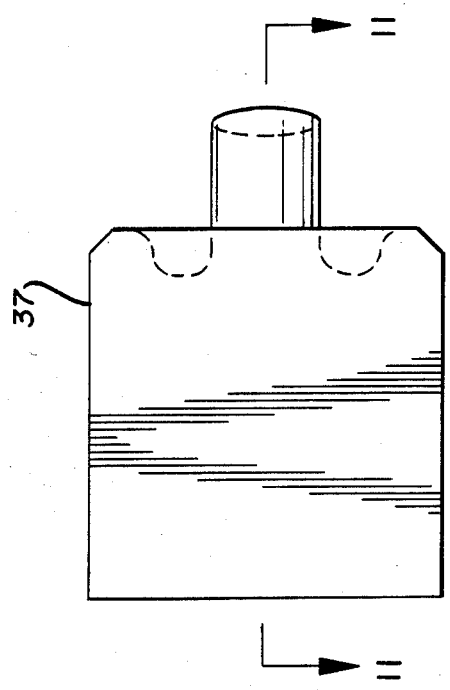
FIG. 12 is a top plan view of the hardened tip portion seen in FIG. 11.
Figure 4:
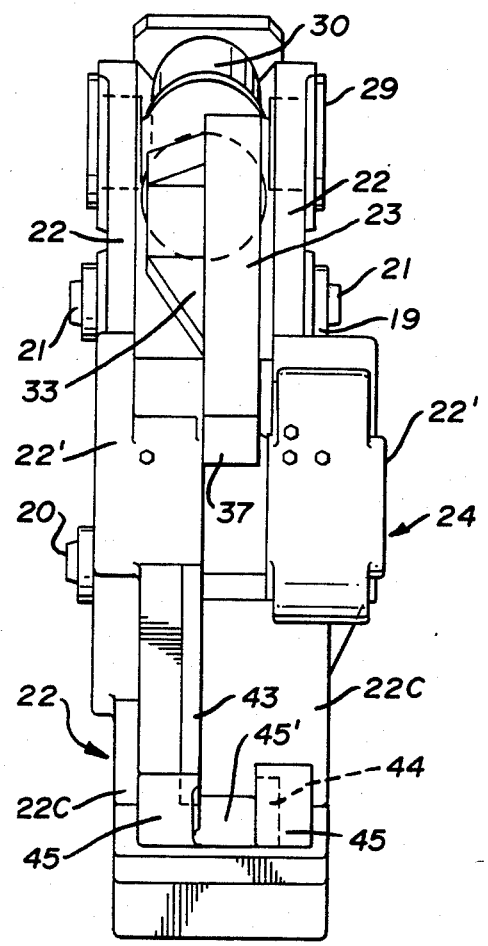
FIG. 4 is an end elevation of the shear seen in FIG. 2.

By referring to FIGS. 1,2 and 3 of the drawings, it will be seen that the fixed blade 22 is elongated and is secured inwardly of its ends to the mounting pins 20 and 21 of the adapter 12 by the horizontally spaced bushings 18 and 19 respectively. The inner end of the fixed blade 22, the right end as seen in FIGS. 1 and 2 of the drawings, carries a bifurcated bearing assembly 29 which pivotally positions a second hydraulic piston and cylinder assembly 30 between spaced portions of the fixed blade 22, the piston rod 31 of which is pivotally engaged on a transverse pin 32 in a bifurcated end 33 of the movable blade 23. Tubes 34 and 35 respectively communicate with the opposite ends of the hydraulic cylinder 30 and a central fitting 36 to which hydraulic fluid is selectively delivered by the hydraulic system of the backhoe on which the device is installed.

Still referring to FIGS. 1,2,3 and 4 of the drawings, it will be seen that the movable blade 23 is generally hook-shaped and has a replaceable hardened cutting end portion 37 on its free end and first and second hardened cutting edge portions 38 and 39 which are attached to sections of the movable blade 23 which are angularly disposed with respect to one another at an angle of approximately 60°.

As shown in FIG. 1, cutting end portion 37 and cutting edge portion 39 are disposed with respect to each other at an angle of approximately 90°. The cutting end portion 37 may, for example, be tack welded to the main body of the movable blade 23. The second hardened cutting edge portion 39 is of an overall length approximately one-third the length of the comparable length of the first hardened cutting edge portion 38 so that the modified V-shape formed by the hardened cutting edge portions 38 and 39 and the apex of the modified V-shape in particular lies relatively close to the point 24 where the shaft 25 pivotally mounts the movable blade 23 to the fixed blade 22 of the shear. The first and second hardened cutting edge portions 38 and 39 are positioned in recesses on the back side of the movable blade 23 as illustrated in FIGS. 1,2, and 3 of the drawings and are secured to the single unitary cast steel movable blade 23 by fasteners 40. A recess in the other side of the movable blade 23 has a hardened wear plate 41 secured therein by fasteners 42.

Still referring to FIGS. 1,2,3 and 7 of the drawings, it will be seen that the unitary cast steel fixed blade 22 has a raised hardened cutting edge portion 43 secured thereto by a plurality of fasteners, the raised hardened cutting edge portion 43 being located inwardly of one of a pair of spaced, upstanding primary guides 45 on a first outermost end of the fixed cast steel blade 22. Adjustable wear plates 44 are positioned on the other one of the guides 45 and the fixed blade 22. One of the guides 45 is pointed and sharpened for metal shearing engagement with all of the three hardened cutting portions 37, 38 and 39 of the movable blade 23 as hereinbefore described. The fixed blade 22 is relatively wider transversely than the movable blade 23 and is provided with a guide slot 45' between the guides 45 and through which the free end 37 of the movable blade 23 will first move as illustrated in broken lines in FIG. 2 of the drawings. It will be observed that when the hardened end 37 has moved through the guide slot 45' in the center of the fixed blade 22, the angular cutting edge portions 38 and 39 of the movable blade 23 will move in shearing relation to the raised cutting portion 43 of the fixed blade 22 and cause a work piece being sheared to move along the hardened cutting portion 43 of the fixed blade 22 toward the pivot point 24 where it is caged. The shearing action takes place in substantially spaced relation to the body of the fixed blade 22.

By referring again to FIG. 1 of the drawings, it will be seen that the movement of the movable blade 23 is responsive to the second hydraulic piston and cylinder assembly including the cylinder 30 and piston rod 31 with the cylinder 30 being pivoted midway between its ends to the inner end of the fixed blade 22 by the bearing and bushing assembly 29. The cylinder 30 and a major portion of the fixed blade 22 lie inwardly (to the right) of the pivot point 24.

It will occur to those skilled in the art that the pivotal mounting of this piston and cylinder assembly as herein disclosed insures a positive shearing action as the shearing force is exerted between the fixed and the movable blades rather than between the movable blade and a portion such as the boom or dip stick of a backhoe as has heretofore been common in the art so that moving force on the movable blades 23 is at a right angle to the cutting portions thereof. The arrangement greatly increases the shearing force available and insures the piercing action of the end 37 in a work piece when desired.

Still referring to FIG. 1 of the drawings, it will be observed that the adapter 12 being pivotally mounted on the end of the boom or dip stick 10 of a backhoe or similar machine enables the entire metal cutting shear to be manipulated relative to the boom or dip stick which enables the shear to be conveniently and easily used in dismantling operation, picking up and moving beams, pipes and sections of dismantled buildings and then shearing the same into appropriately sized scrap pieces with an unusual flexibility of motion as compared with the prior art devices.

The formation of the fixed blade and movable blade of the device as single unitary structures further contributes to the unusual effectiveness and shearing ability of the device herein disclosed as the prior art devices have been built up of frame cut steel plate and the like.

By referring now to FIGS. 8, 9 and 10 of the drawings, the structure of the novel adapter 12 may be seen to include a pair of horizontally spaced, elongated body members 46 and 47 of a modified triangular shape and having three transversely positioned tubular members forming bushings 13, 18, and 19 respectively, positioned in the corners of the modified triangular shaped horizontally spaced body members 46 and 47. A wrap-around body member 48 is positioned on the edges of the horizontally spaced modified V-shaped body members 46 and 47 and is welded thereto so as to form a horizontal top portion and an angularly disposed bottom portion as seen in FIG. 8 of the drawings. Several spacing members 49 are positioned between the tubular members 13 and 18 and a secondary body member 50 is attached to the several spacing members 49 and the tubular members 13 and 18. An apertured tab 51 with reinforcing side portions 52 is attached to the wrap-around body member 48 and extends through an opening therein and is secured to the spacing members 49 as best shown in broken lines in FIG. 9 of the drawings. A pair of horizontally spaced secondary body members 53 and 54 are attached to the upper horizontal portion of the wrap-around body member 48 and extend downwardly through openings in the lower or bottom portion of the wrap-around body member 48 and outwardly thereof and are apertured near their outer lower ends to receive a pair of secondary tubular body members which form the bushings 14 heretofore referred to.

In FIG. 10 of the drawings, an enlarged cross section on line 10—10 of FIG. 8 illustrates the right end portion of the adapter of FIG. 8.

The adapter as illustrated herein in FIGS. 8, 9 and 10 is actually of a width that will fit upwardly into the fixed blade 22 as best shown in FIGS. 1,2, and 6 of the drawings and it will be observed that the transverse pivot 11 is engaged in the tubular member 13, the pin 20 is engaged in the bushing formed by the tubular member 18, the pin 21 is engaged in the bushing formed by the tubular member 19 and the pair of tubular members 14 are positioned in the horizontally spaced members 53 and 54 respectively so that the piston rod 15 of the piston and cylinder 16 can be secured to the adapter 12 thereby.

It will occur to those skilled in the art that different backhoes or material handling or excavating machines made by different manufacturers may and do require the relocation of the bushings 14 carried by the members 53 and 54 as the spacing between the bushings 13 and 14 varies somewhat in the different machines.

It will thus be seen that by affixing the adapter 12 to the boom 10 and actuating piston and cylinder assembly 15 and 16 of a conventional backhoe or the like, the shear of the present disclosure may be conveniently and quickly mounted thereon by inserting the fasteners comprising the pins 20 and 21 and securing them as will be understood by those skilled in the art.

In FIGS. 2,3,6 and 7 of the drawings, the cast unitary fixed cutting blade 22 of the shear will be seen to include horizontally spaced vertically positioned parallel beam portions having upper and lower sections 22A and 22B respectively with longitudinally spaced horizontally positioned sections 22C therebetween defining an area in which said adapter 12 is removably positioned and in which the guide slot 45' is located.

By referring to FIG. 2 of the drawings, it will be seen that broken lines illustrated the positioning of the movable blade 23 of the shear and it will further be observed that the pivotal arrangement of the movable blade 23 to the fixed blade 22 by the hereinbefore described shaft 25 and its adjustable thrust bearings 27 enable the movable blade 23 to be adjustably positioned between horizontally spaced portions of the fixed blade 22 as defined by the extensions 22' fastened thereto.

By referring to FIG. 6 of the drawings, a section on line 6—6 of FIG. 2 illustrates the spacing of portions of the unitary cast steel fixed blade 22 and the positioning of the adapter 12 therein where it is held by the pins 20 and 21 positioned through the tubular members 18 and 19 which form the bushings therefor. In FIG. 2 of the drawings, the tubular members 14 are illustrated and to which the piston rod 15 of the piston cylinder 16 is attached as hereinbefore described. The apertured tab 51 of the adapter 12 forms a convenient means for the attachment of a magnet, hook or other device which will facilitate the handling of scrap in dismantled buildings and the like. The positioning of the fixed blade and the movable blade of the present disclosure are substantially the same as the comparable fixed blade and movable blade and its V-shaped cutting edges as illustrated and described in our U.S. Pat. No. 4,450,625 which was a continuation-in-part of our application Ser. No. 261,679, now U.S. Pat. No. 4,376,340.

In the present invention, the mounting of the shear on the adapter 12 which is positioned midway of the shear and pivoted to the boom 10 or dipstick of the backhoe positions a large amount of the shear's weight and its operating piston and cylinder 30 behind the boom pivot 11 and enables the shear to be used at a greater distance from the backhoe than has heretofore been possible.

Although but one embodiment of the present invention has been illustrated and described, it will be apparent to those skilled in the art that various changes and modifications may be made therein without departing from the spirit of the invention and having thus described our invention, what we claim is:

1. A cutting and manipulating attachment for a backhoe, the bucket of which has been removed and having a boom with a controlled piston and cylinder assembly connected thereto comprising: a shear comprising an elongated, unitary cast steel fixed cutting blade having a raised cutting edge portion, said fixed cutting blade having horizontally spaced, vertically positioned, parallel beam portions and horizontal sections therebetween, a unitary cast steel movable cutting blade having first, second and third cutting edge portions, means inwardly of a first end of said fixed cutting blade pivotally mounting said movable cutting blade thereon in pivotal relation to said fixed cutting blade from an open position to a closed work piece shearing position, wherein said first and third cutting edge portions of said movable cutting blade are arranged in substantially right angular relation to one another, wherein said first cutting edge portion is directly adjacent to said means for pivotally mounting, wherein the length of said first cutting edge portion is substantially less than the length of said second cutting edge portion and wherein the length of the first cutting edge portion is substantially less than the length of said raised cutting edge portion of said fixed blade, whereby the cutting takes place relatively closer to said means for pivotally mounting than if said first and second cutting edge portions were of substantially equal length, whereby said fixed blade and the movable blade are structured to urge a workpiece being cut to move along said fixed cutting blade toward said means for pivotally mounting, to generate more shearing force than if the workpiece were sheared at a greater distance from said means for pivotally mounting, means for keeping the cutting edge portions of said movable cutting blade in shearing relation to said raised cutting edge portion of said fixed cutting blade through the entire extent of the shearing movement of the blades with respect to each other, said third portion of said movable cutting blade being directed generally toward said elongated fixed cutting blade, said means for keeping the cutting edge portions of said movable cutting blade in shearing relation to said raised cutting edge portion of said elongated fixed cutting blade comprising a slot in a horizontal section of said elongated fixed cutting blade inwardly of said first end thereof and defining an elongated guide path, said slot being positioned and sized to receive said end cutting portion of said movable cutting blade and said cutting edge portions of said movable cutting blade in shearing relation to a work piece disposed between said blades, a second piston and cylinder assembly pivotally engaged on a second end of said elongated fixed cutting blade and means operatively connecting said movable cutting blade to said second piston and cylinder assembly so that the same can be moved relative to said fixed cutting blade thereby from said open to closed position and vice versa.

2. A device as recited in claim 1 and wherein said spaced, parallel beam portions of said fixed cutting blade extend along said slot therein at an angle to said raised cutting portion of said fixed cutting blade.

3. A device as recited in claim 1 and wherein upstanding primary guides are positioned on said first end of said fixed blade for guiding, holding, and shearing engagement with a work piece between said blades.

4. A device as recited in claim 1 and wherein detachable hardened cutting bars form said cutting edge portions of said fixed and movable blades.

5. A device as recited in claim 4 wherein said detachable hardened cutting bars on said movable cutting blade are of different lengths and positioned so as to form an inverted V-shape.

6. A device as recited in claim 1 and wherein said first cutting edge portion is approximately one-third the length of said second cutting edge portion.

7. A device as recited in claim 1, further including an adapter body and means for pivotally attaching the adapter body to the boom at a backhoe, means for removably attaching said fixed cutting blade to said adapter body and means on said adapter body in spaced relation to said means for pivotally attaching said adapter body to said boom of said backhoe operatively connecting said adapter body to said controlled piston and cylinder assembly so that said adapter body member and said shear can removed relative to said boom, wherein said parallel beam portions and a horizontal section therebetween define a first cavity in said elongated fixed cutting blade and said adapter body is positioned substantially in said first cavity.

8. A device as recited in claim 1 and wherein said parallel beam portions and a horizontal section therebetween define a second cavity in said elongated fixed cutting blade and said second piston and cylinder assembly is positioned substantially in said second cavity.

9. A device as recited in claim 7 and wherein said parallel beam portions and horizontal sections therebetween define oppositely disposed first and second cavities in said elongated fixed cutting blade and said adapter body is positioned substantially in said first cavity and said second piston and cylinder assembly is positioned substantially in said second cavity.

10. A device as recited in claim 8 and wherein said second piston and cylinder assembly is pivoted midway between its ends to said parallel beam portions of said elongated fixed cutting blade.

11. A device as recited in claim 8 further including means for pivotably engaging said second piston and cylinder assembly and said movable blade and wherein when said cutting edge portions of said movable blade are in shearing relation to said raised cutting edge portion of said fixed cutting blade, the second piston and cylinder assembly is positioned with respect to said cutting edge portions of said movable blade, such that a line, taken from the pivot point of said means for pivotally engaging at an angle of about 90° with respect to the second piston cylinder longitudinal axis, will pass through at least one of said cutting edge portions of said movable blade.

12. A device as recited in claim 1 and wherein said cutting end portion of said movable cutting blade is removably attached to said movable cutting blade, an extending portion of said cutting end portion being tack welded in a opening in said movable cutting blade.

13. A device as recited in claim 3 and wherein said cutting end portion is sharpened transversely and sharpened along one of its sides so as to cut a work piece crossways between said upstanding primary guides and cut said work piece along the side of one of said upstanding primary guides.

14. A device as recited in claim 1 and wherein spaced members are removably secured to said fixed blade and said movable cutting blade is pivotally attached to said spaced members by a transverse shaft adjustably positioned in bores in said spaced members and engaged in bushings positioned in said spaced members on said fixed cutting blade.

15. A device as recited in claim 14 and wherein said spaced members are removably secured to said parallel beam portions of said fixed blade.

16. A device as recited in claim 7 and wherein said adapter body consists of a pair of horizontally spaced body members, a wrap-around body member attached to the edges of said spaced body members, said means on said adapter body operatively connecting said adapter body to said control piston and cylinder assembly comprising a pair of horizontally spaced secondary body members attached to said wrap-around body member at oppositely disposed points thereon and extending outwardly therefrom, bushings in openings in said secondary body members.

17. A device as recited in claim 1 wherein spaced members are removably attached to said elongated fixed cutting blade and said movable cutting blade is pivotally attached to said spaced members by a transverse shaft adjustably positioned in bores in said spaced members and engaged in bushings and engaged against thrust bearings in said spaced members on said elongated fixed cutting blade.

18. A device as recited in claim 1 wherein said elongated fixed cutting blade comprises a unitary steel casting characterized by having a pair of horizontally spaced vertically positioned, parallel beams having upper and lower portions and longtudinally spaced interconnecting sections between said beams, some of which interconnect said upper portions of said beams and some of which interconnect said lower portions of said beams.

19. A device as recited in claim 18 and wherein said raised cutting portion of said elongated fixed cutting blade is positioned on one of said horizontally spaced vertically positioned beams and spaced vertically with respect to said interconnecting sections whereby a sheared work piece between said blades can move down and away from said raised cutting portion.

20. A cutting and manipulation attachment for a backhoe, the bucket of which has been removed and having a boom with a controlled piston and cylinder assembly connected thereto comprising: a shear having an elongated, fixed cutting blade having a raised cutting edge portion and removable means pivotally attaching said fixed cutting blade to said boom, said fixed cutting blade having horizontally spaced, vertically positioned, parallel beam portions and horizontally disposed sections therebetween, means inwardly of a first end of said fixed cutting blade pivotally mounting a hook-shaped movable cutting blade thereon in movable relation to said fixed cutting blade from an open position to a closed work piece shearing position, said hook shaped portion including first, second and third cutting edge portions, said first and third cutting edge portions of said hook-shaped cutting blade arranged in substantially right angular relation to one another, wherein said first cutting edge portion is directly adjacent to said means for pivotally mounting, wherein the length of said first cutting edge portion is substantially less than the length of said second cutting edge portion, and wherein the length of first cutting edge portion is substantially less than the length of said raised cutting edge portion of said fixed blade, whereby the cutting takes place relatively closer to said means for pivotally mounting than if said first and second cutting edge portions were of substantially equal length, whereby said fixed blade and the movable blade are structured to urge a workpiece being cut to move along said fixed blade toward said means for pivotally mounting, to generate more shearing force than if the workpiece were sheared at a greater distance from said means for pivotally mounting, means for keeping the cutting edge portions of said hook-shaped cutting blade in shearing relation to said raised cutting edge portion of said fixed cutting blade through the entire extent of the shearing movement of the blades with respect to each other, said third cutting edge portion of said hook-shaped movable cutting blade having a sharpened end portion directed generally toward said fixed cutting blade, said means for keeping the cutting edge portions of said hook-shaped movable cutting blade in shearing relation to said raised cutting edge portion of said fixed cutting blade comprising a slot in a horizontal section of said fixed cutting blade inwardly of said first end thereof and oppositely disposed raised members on said fixed cutting blade alongside said slot defining an elongated guide path, said slot being positioned and sized to receive and maintain said sharpened end portion of said hook-shaped movable cutting blade and said cutting edge portions of said hook-shaped movable cutting blade in shearing relation to a work piece disposed between said blades, a second piston and cylinder assembly pivotally engaged on a second end of said elongated fixed cutting blade and means operatively connecting said hook-shaped movable cutting blade to said second piston and cylinder assembly so that the same can be moved in an arcuate path relative to said fixed cutting blade thereby from said open to closed position and vice versa, and means on said fixed cutting blade in spaced relation to said removable means pivotally attaching said fixed cutting blade to said boom of said backhoe operatively connecting said fixed cutting blade to said controlled piston and cylinder assembly so that said shear can be moved relatively to said boom.

21. A cutting and manipulating attachment for a backhoe, the bucket of which has been removed and having a boom with a controlled piston and cylinder assembly connected thereto comprising: an adapter body and means for pivotally attaching the same to the boom of the backhoe, a shear comprising an elongated, fixed cutting blade having a raised cutting edge portion and means removably attaching said fixed cutting blade to said adapter body, said fixed cutting blade having horizontally spaced, vertically positioned, parallel beam portions and horizontal sections therebetween, a movable cutting blade having first, second, and third cutting edge portions thereon, means inwardly of a first end of said fixed cutting blade for pivotally mounting a movable cutting blade thereon in pivotal relation to said fixed cutting blade from an open position to a closed work piece shearing position, wherein said means for pivotally mounting a movable cutting blade includes a shaft having a first predetermined diameter portion and a second predetermined diameter portion and means connected to said second predetermined diameter portion to tightly position said movable blade on said means for pivotally mounting, wherein said first and third cutting edge portions are arranged in substantially right angular relation to one another, wherein said first cutting edge portion is directly adjacent to said means for pivotally mounting and wherein the length of said first cutting edge portion is substantially less than the length of said second cutting edge portion, whereby the cutting takes place relatively closer to said means for pivotally mounting than if said sides were of substantially equal length, means for keeping the cutting edge portions of said movable cutting blade in shearing relation to said raised cutting edge portion of said fixed cutting blade through the entire extent of the shearing movement of the blades with respect to each other, said means for keeping the cutting edge portions of said movable cutting blade in shearing relation to said raised cutting edge portion of said elongated fixed cutting blade comprising a slot in a horizontal section of said elongated fixed cutting blade inwardly of said first end thereof and defining an elongated guide path, said slot being positioned and sized to receive said end cutting portion of said movable cutting blade and said cutting edge portions of said movable cutting blade in shearing relation to a work piece disposed between said blades, a second piston and cylinder assembly pivotally engaged on a second end of said elongated fixed cutting blade and means operatively connecting said movable cutting blade to said second piston and cylinder assembly so that the same can be moved relative to said fixed cutting blade thereby from said open to closed position and vice versa, and means on said adapter body in spaced relation to said means for pivotally attaching said adapter body to said boom of said backhoe operatively connecting said adapter body to said controlled piston and cylinder assembly so that said adapter body member and said shear can removed relatively to said boom.

* * * * *